US011194743B2

United States Patent
Solanki et al.

(10) Patent No.: US 11,194,743 B2
(45) Date of Patent: Dec. 7, 2021

(54) METHOD OF ACCESSING A DUAL LINE SSD DEVICE THROUGH PCIE EP AND NETWORK INTERFACE SIMULTANEOUSLY

(71) Applicant: SAMSUNG ELECTRONICS CO., LTD., Suwon-si (KR)

(72) Inventors: Anil Desmal Solanki, Karnataka (IN); Venkataratnam Nimmagadda, Karnataka (IN); Prashant Vishwanath Mahendrakar, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/435,063

(22) Filed: Jun. 7, 2019

(65) Prior Publication Data

US 2020/0019521 A1 Jan. 16, 2020

(30) Foreign Application Priority Data

Jul. 16, 2018 (IN) .............................. 201841026535

(51) Int. Cl.
*G06F 13/10* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026
See application file for complete search history.

(56) References Cited

U.S. PATENT DOCUMENTS

| 10,007,443 | B1 * | 6/2018 | Rajadnya | G06F 3/0659 |
| 10,331,600 | B1 * | 6/2019 | Rajadnya | G06F 13/4022 |
| 10,635,598 | B2 * | 4/2020 | Veal | G06F 13/1642 |
| 10,735,513 | B2 * | 8/2020 | Tsalmon | G06F 15/167 |
| 10,764,180 | B1 * | 9/2020 | Klein | H04L 49/25 |
| 10,860,511 | B1 * | 12/2020 | Thompson | G06F 13/4282 |
| 2017/0357610 | A1 * | 12/2017 | Thompson | G06F 12/0246 |
| 2018/0032469 | A1 * | 2/2018 | Olarig | G06F 13/387 |
| 2018/0131633 | A1 * | 5/2018 | Li | H04L 47/72 |
| 2019/0034103 | A1 * | 1/2019 | Voigt | G06F 12/0246 |
| 2019/0079895 | A1 * | 3/2019 | Kim | G06F 3/061 |

* cited by examiner

*Primary Examiner* — Cheng Yuan Tseng
(74) *Attorney, Agent, or Firm* — Volentine, Whitt & Francos, PLLC

(57) ABSTRACT

A method of accessing a dual line solid-state drive (SSD) device through a network interface and a PCIe EP simultaneously. The method includes: (1) establishing, by the dual line SSD device, a connection with a remote server through the network interface, (2) establishing, by the remote server, an administrative queue with the dual line SSD device, (3) establishing, by the remote server, an input/output queue with the dual line SSD device by posting a command in the administrative queue over the network interface to initiate transfer of data, (4) establishing, by the dual line SSD device, a connection with a local server over the PCIe EP, (5) establishing, by the local server, the administrative queue over the PCIe EP, and (6) establishing, by the local server, the input/output queue by posting the command in the administrative queue over the PCIe EP to initiate transfer of the data.

17 Claims, 8 Drawing Sheets

METHOD OF ACCESSING A DUAL LINE SSD DEVICE THROUGH PCIE EP AND NETWORK INTERFACE SIMULTANEOUSLY

CROSS-REFERENCE TO RELATED APPLICATION

This application claims priority from Indian Patent Application No. 201841026535 filed on Jul. 16, 2018, and all the benefits accruing therefrom under 35 U.S.C. 119, the contents of which in their entirety are herein incorporated by reference.

TECHNICAL FIELD

This disclosure generally relates to non-volatile memory devices and particularly relates to solid state drive (SSD) devices accessing remote servers and local servers simultaneously by using a dual line interface of an SSD device.

BACKGROUND

Typically, a central processing unit (CPU) can access remote storage or I/O devices over a network by using network protocols. One approach to access remote storage or input/output (I/O) devices is through internet small computer system interface (iSCSI) storage. This approach uses significant processing cycles of the CPU, which increases total access latency. Accessing remote storage or I/O devices via iSCSI storage usually has latency several times greater than a direct access of local storage or I/O devices. This leads to noticeable performance and throughput degradation for systems requiring remote storage or I/O devices access over a network.

A relatively new interface standard that deals with local non-volatile memory (NVM) access is NVM Express (NVMe), sometimes referred to as the non-volatile memory host controller interface specification. NVMe is a register-level interface that allows host software to communicate with a non-volatile memory subsystem. This interface is optimized for enterprise and client SSDs, which are typically attached to a peripheral component interconnect Express (PCIe) interface. NVMe provides a direct I/O access to local non-volatile memory. Using NVMe, the latency of read and write operations is reduced, compared with connecting over traditional I/O interfaces, such as serial small computer system interface (SCSI) or serial ATA (SATA).

However, NVMe has a limitation pertaining to transfer of data over Ethernet switches or other types of networks. Generally, NVMe is designed to access local SSDs and is not defined in terms of accessing remote storage through a network. The new standard of non-volatile memory express over fabrics (NVMeoF) provides solutions for accessing multiple remote SSDs by multiple server CPUs through a network. However, the SSDs (either NVMe or NVMeoF SSDs) pose the following drawbacks:

1. NVMe SSD Data Protection: Data in an NVMe SSD is in-accessible, when a PCIe Endpoint (EP) is down.
2. NVMeoF SSD Data Protection: The data in an NVMeoF SSD is in-accessible, when ethernet is down.
3. Under-utilization of an NVMe SSD when locally attached.
4. An NVMeoF SSD operates as a Storage target only, it will not be operated as both a Network target and a Network initiator simultaneously for providing storage as well as remote network interface controller (RNIC) kinds of functionalities simultaneously.

FIG. 1 is a schematic diagram illustrating inaccessibility of data in a PCIe based SSD device 104 when a PCIe EP 106 is down, according to a related art. According to this related art, the PCIe based SSD device 104 includes the PCIe EP 106, an NVMe controller 108, a flash translation layer (FTL) 110 and a flash 112. A connection between the PCIe based SSD device 104 and a local server 102 is established through the PCIe EP 106. FIG. 1 illustrates a scenario in which the PCIe EP 106 is down or malfunctions, so that the connection between the PCIe based SSD device 104 and the local server 102 is cut off and the data in the PCIe based SSD device 104 is inaccessible. Accordingly, there remains a need for a network interface to establish the connection with the PCIe based SSD device 104 over a network for enabling access and transfer of the data.

FIG. 2 is a schematic diagram illustrating inaccessibility of data in an NVMeoF based Ethernet SSD device 204 when a network interface 206 is down, according to a related art. According to this related art, the NVMeoF based Ethernet SSD device 204 includes the network interface 206, an NVMeoF Controller 208, an FTL 210 and a flash 212. The network interface 206 is adapted to enable connection with a remote server 202 for transfer of data. FIG. 2 illustrates a scenario in which the network interface 206 is down or malfunctions, so that the connection between the NVMeoF based Ethernet SSD device 204 and the remote server 202 is cut off and the data in the NVMeoF based Ethernet SSD device 204 is inaccessible. Accordingly, there remains a need for a PCIe EP within the NVMeoF based Ethernet SSD device 204 for enabling access of the data transfer over the PCIe EP.

In view of the foregoing, there exists the need for an SSD that can act both as an initiator and a target over a network interface (e.g. ethernet network) to provide access to remote servers efficiently.

FIG. 3 is a schematic diagram illustrating under-utilization of a PCIe based SSD device, according to a related art. According to this prior art, the PCIe based SSD device 304 includes PCIe EP 306, an NVMe controller 308, an FTL 310 and a flash 312. The connection between the PCIe based SSD device 304 and a local server 302 is established through the PCIe EP 306. FIG. 3 illustrates a scenario in which the local server 302 is under utilizing the PCIe based SSD device 304 in terms of the device's storage capacity and bandwidth. Accordingly, there remains a need for a system and method to utilize the PCIe based SSD's storage capacity and bandwidth efficiently.

The above-mentioned shortcomings, disadvantages and problems are addressed herein and applicants' disclosure will be understood by reading and studying the following specification.

SUMMARY

According to an embodiment of the disclosure, a method of simultaneously accessing a dual line solid-state drive (SSD) device through a network interface and a peripheral component interconnect express end point (PCIe EP) includes: (1) establishing, by a remote server, a first connection with the dual line SSD device through the network interface by creating a plurality of network transport queue pairs; (2) establishing, by the remote server, an administrative queue with the dual line SSD device using a non-volatile memory express over fabrics (NVMeoF) through the plurality of network transport queue pairs; (3) establishing, by the remote server, an input or output queue with the dual line SSD device by posting a command in the administrative queue over the network interface through the plurality of network transport queue pairs; (4) establishing, by a local server, a second connection with the dual line SSD device over the PCIe EP; (5) establishing, by the local server, the administrative queue over the PCIe EP utilizing a NVMeoF protocol through remote direct memory access (RDMA); (6) establishing, by the local server, the input or output queue by posting the command in the administrative queue over the PCIe EP; (7) transferring, by an NVMeoF controller, first data between the local server and the dual line SSD device when the second connection is established between the local server and the dual line SSD device; and (8) transferring, by the NVMeoF controller, second data between the remote server and the dual line SSD device when the first connection is established between the remote server and the dual line SSD device.

According to another embodiment of the disclosure, a method to enable a transfer of data from a dual line SSD device, upon failure of a PCIe EP, includes: (1) establishing, by a server, a connection with the dual line SSD device over a network interface by creating a plurality of network transport queue pairs; (2) triggering, by the server, a command to the dual line SSD device over the network interface for initiating transfer of the data, wherein the data is stored by the server over a peripheral component interconnect express before a connection failure with the PCIe EP; and (3) transferring the data between the dual line SSD device and the server over the network interface.

According to another embodiment of the disclosure, a method of enabling thin provision on a dual line SSD device includes: (1) accessing, by a local server, a local storage of the dual line SSD device through a PCIe EP; (2) extracting, by a remote server through a discovery log, information about utilization of the local storage; and (3) accessing, by the remote server, data from the dual line SSD device through a network interface when the local storage is underutilized by the local server.

According to another embodiment of the disclosure, a method to enable transfer of data from a dual line SSD device, upon failure of a network interface, includes: (1) establishing, by a server, a connection between the server and the dual line SSD device over a PCIe EP by creating input or output queue pairs and administrative queue attributes; (2) triggering, by the server over the PCIe EP, a command to the dual line SSD device that initiates transfer of the data, wherein the data is stored by the server over the network interface before a connection failure with the network interface; and (3) transferring the data between the dual line SSD device and the server over the PCIe EP.

According to another embodiment of the disclosure, a dual line SSD device includes: (1) a network interface that establishes a first connection with a remote server by creating a plurality of network transport queue pairs; (2) a PCIe EP that establishes a second connection with a local server; (3) an NVMe controller that establishes a first data transfer between the local server and the dual line SSD device when the second connection is established between the local server and the dual line SSD device; and (4) an NVMeoF target controller that establishes a second data transfer between the remote server and the dual line SSD device when the first connection is established between the local server and the dual line SSD device.

According to another embodiment of the disclosure, a dual line SSD device includes: (1) a nonvolatile memory device; (2) a network interface that communicates first data between the nonvolatile memory device and a remote server through an NVMeoF connection; and (3) a PCIe EP that communicates first data between the nonvolatile memory device and a local server through an NVMe connection.

BRIEF DESCRIPTION OF THE DRAWINGS

Other objects, features and advantages will occur to those skilled in the art from the following description of the preferred embodiment and the accompanying drawings in which.

Although specific features of the present disclosure are shown in some drawings and not in others, this is done for convenience only as each feature may be combined with any or all of the other features in accordance with the present disclosure.

DETAILED DESCRIPTION

The present disclosure provides a method for accessing a dual line SSD device over a PCIe EP and a network interface for data transfer and data protection. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
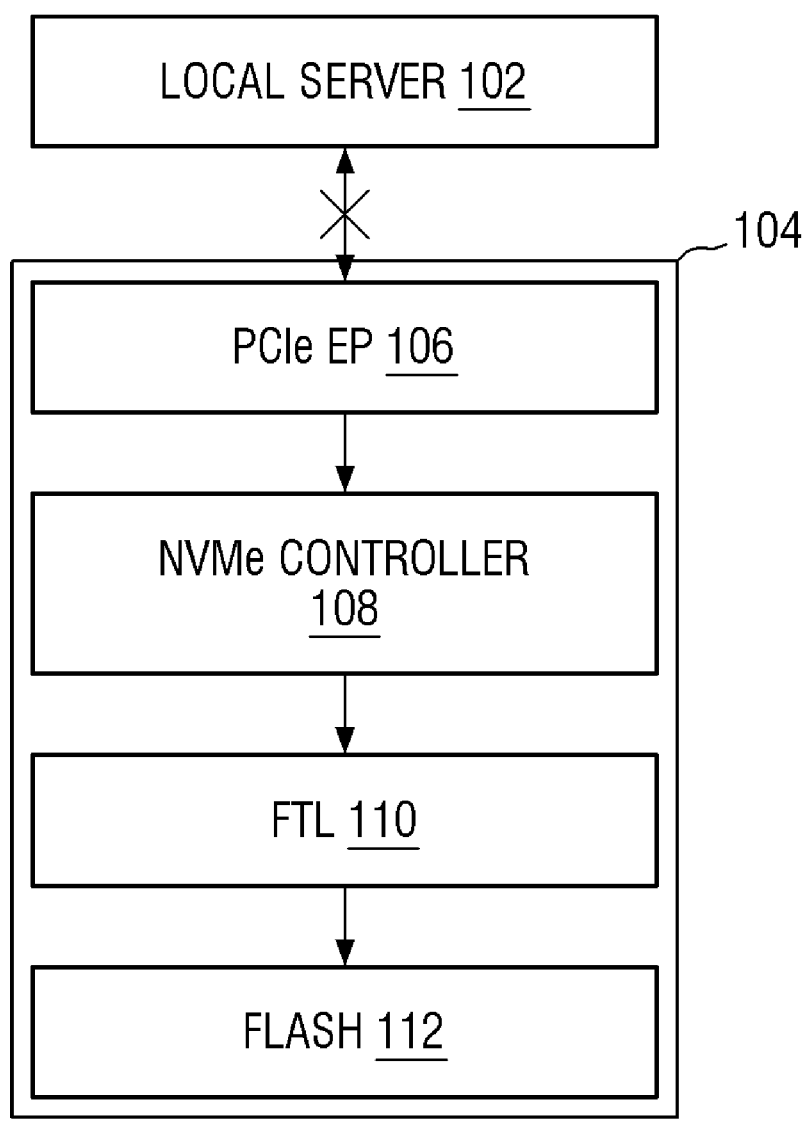
FIG. 1 is a schematic diagram illustrating inaccessibility of data in a PCIe based SSD device when a PCIe EP is down, according to a related art.
Figure 2:
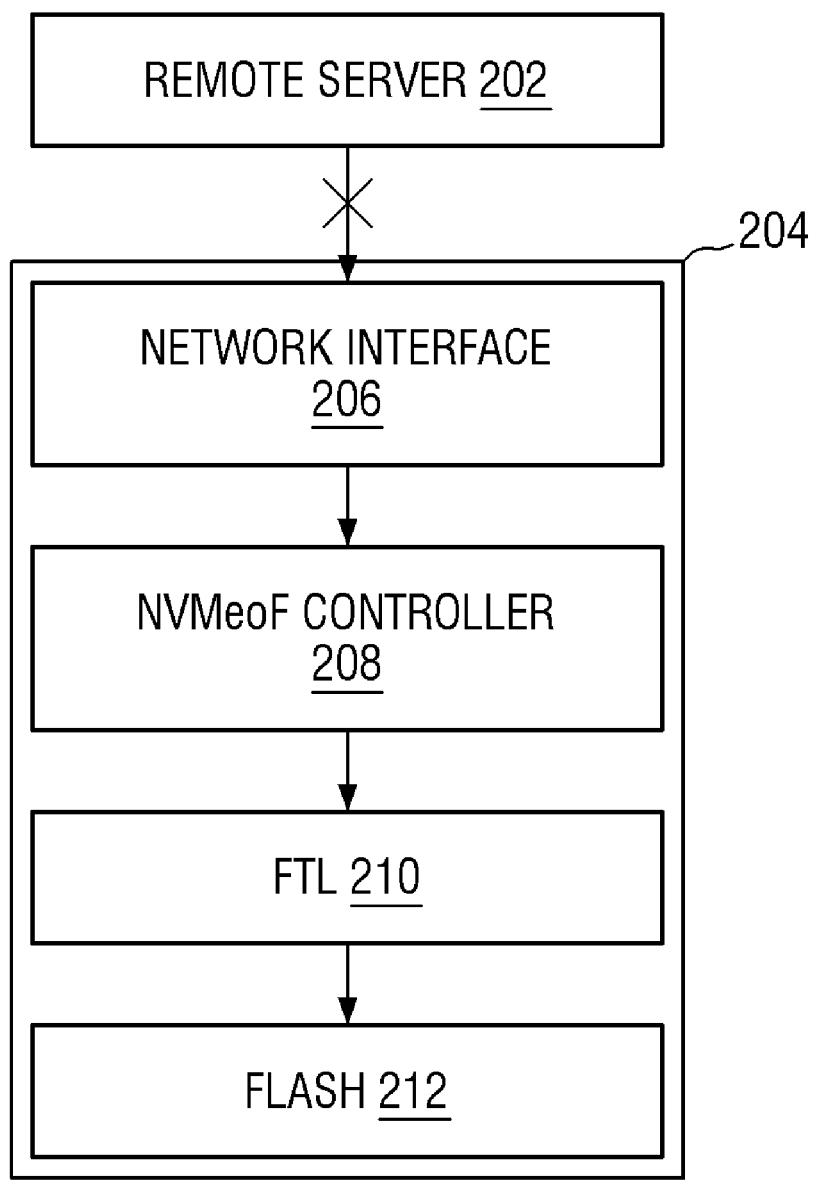
FIG. 2 is a schematic diagram illustrating inaccessibility of data in an NVMeoF based Ethernet SSD device when a network interface is down, according to a related art.
Figure 3:
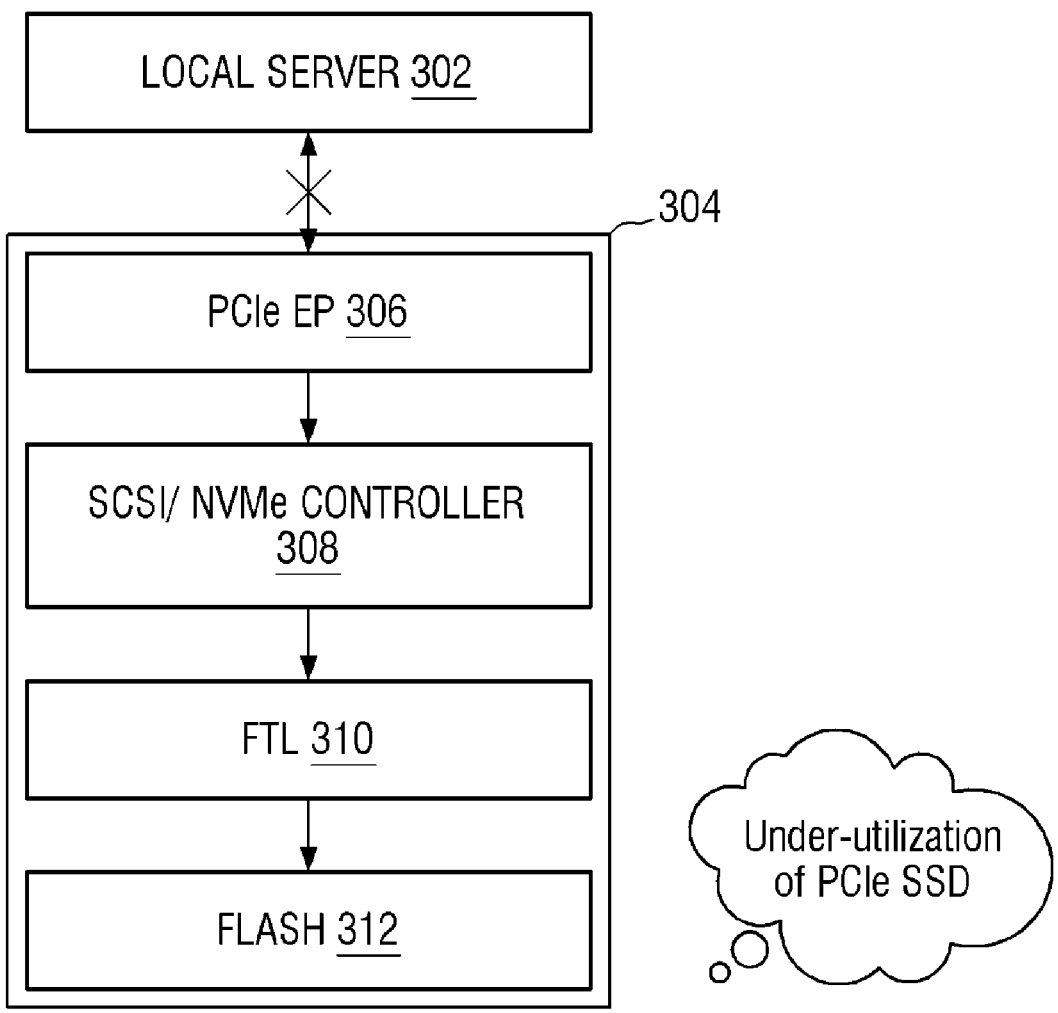
FIG. 3 is a schematic diagram illustrating under-utilization of a PCIe based SSD device, according to a related art.
Figure 4:
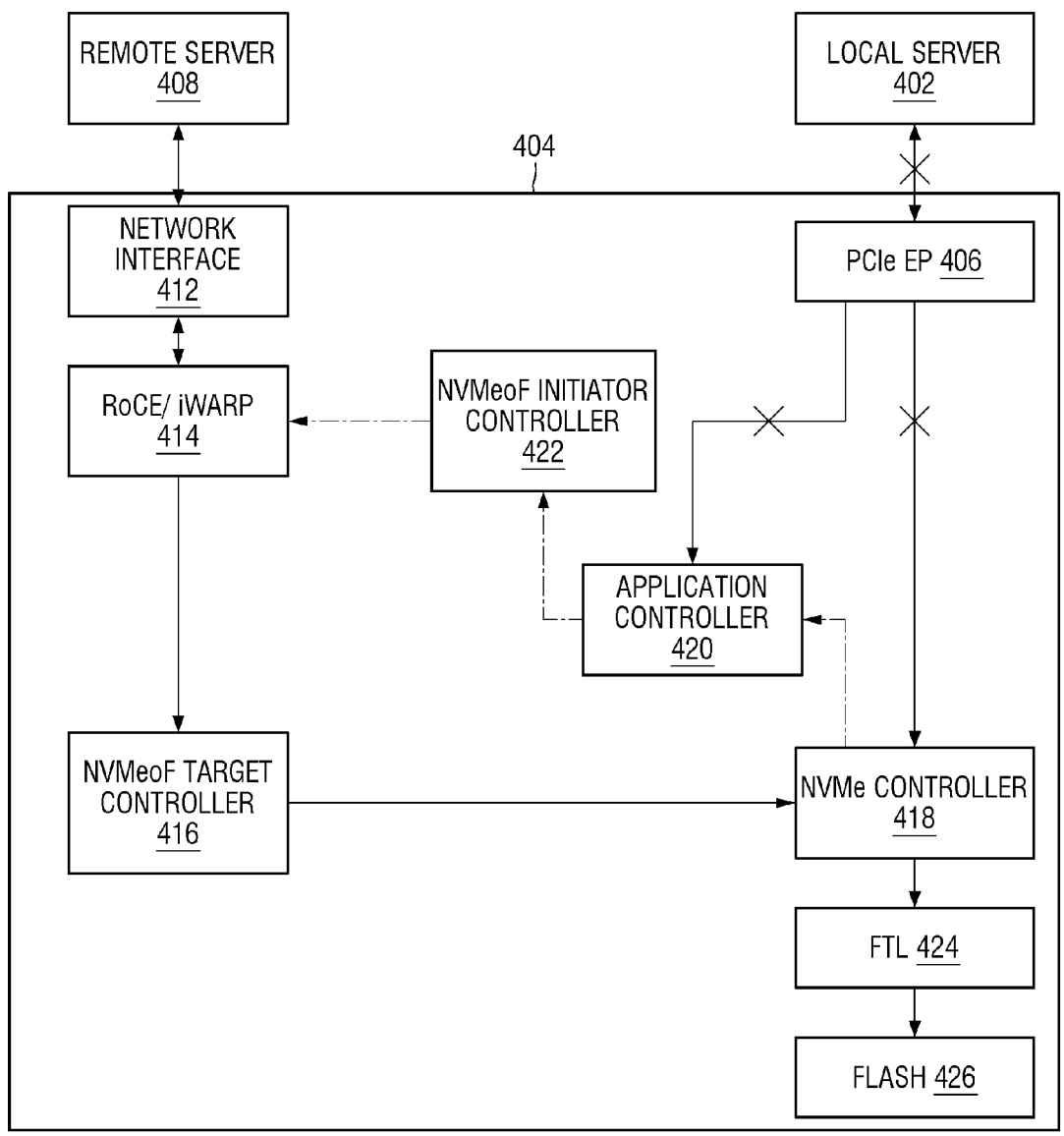
FIG. 4 illustrates a method for enabling data transfer between a dual line SSD device and a server upon failure of a peripheral component interconnect express end point (PCIe EP), according to an embodiment of the present disclosure.

FIG. 4 illustrates a method for enabling data transfer between a dual line SSD device 404 and a remote server 408 upon failure of a PCIe EP 406, according to an embodiment of the present disclosure. According to this embodiment, the remote server 408 establishes connection with the dual line SSD device 404 over a network interface 412 by creating a plurality of network transport queue pairs. The remote server 408 then triggers a command to the dual line SSD device 404 over the network interface 412 for initiating transfer of data, wherein the data is stored by a local server 402 over the PCIe EP 406 before occurrence of a connection failure of the PCIe EP 406. The connection failure of PCIe EP 406 includes (a) a connection failure between the PCIe EP 406 and the local server 402 (b) a connection failure between the PCIe EP 406 and an application controller 420 and (c) a connection failure between the PCIe EP 406 and an NVMe controller 418 (as shown in FIG. 4). The data transfer is enabled between the dual line SSD device 404 and the remote server 408 over the network interface 412 when the PCIe EP 406 is down or fails to access the dual line SSD device 404 (as shown by a solid line path in FIG. 4).

Figure 5:
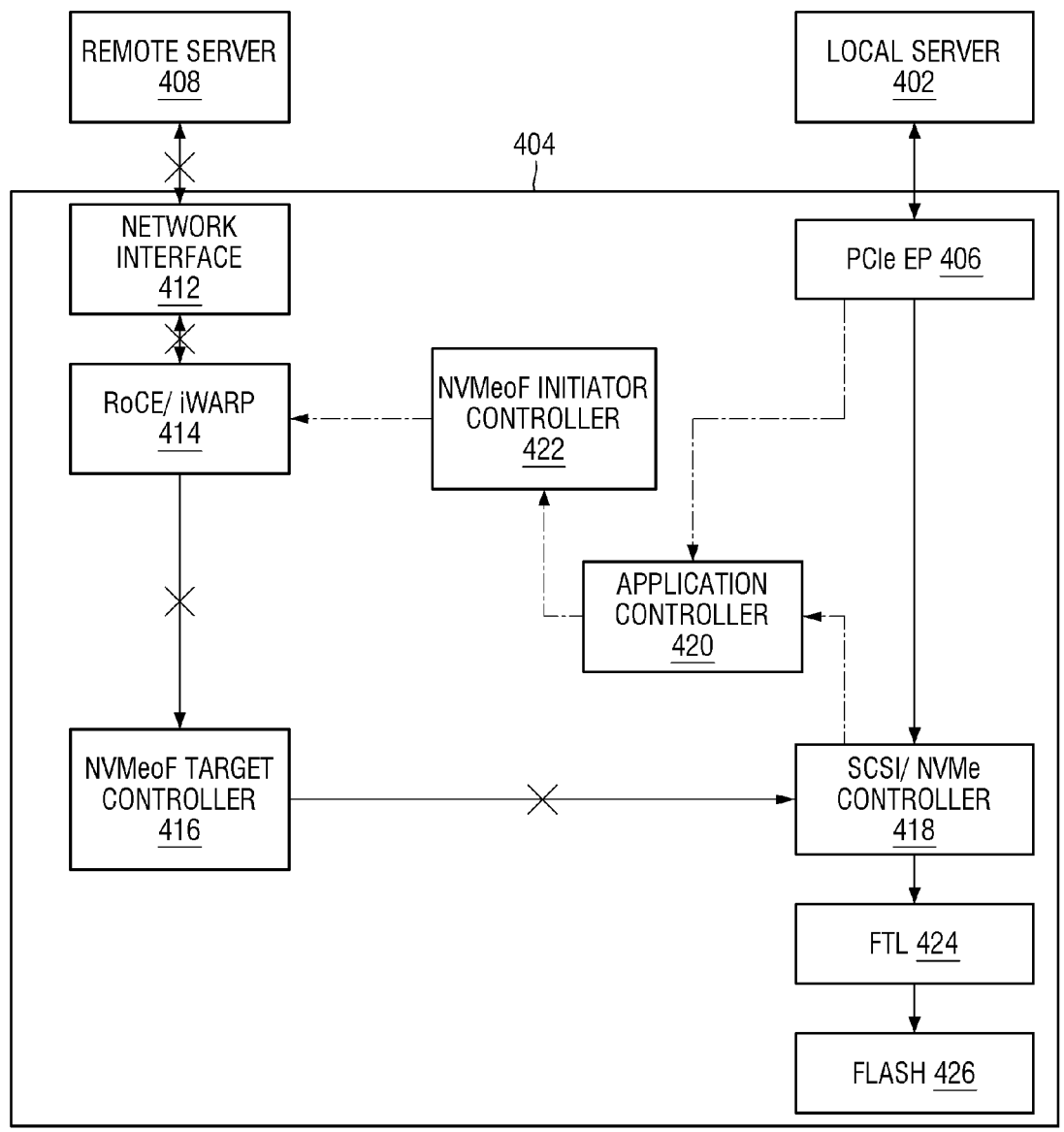
FIG. 5 illustrates a method for enabling data transfer between a dual line SSD device and a server upon failure of a network interface, according to an embodiment of the present disclosure.

FIG. 5 illustrates a method for enabling data transfer between a dual line SSD device 404 and a local server 402 upon failure of a network interface 412, according to an embodiment of the present disclosure. According to this embodiment, the local server 402 establishes a connection with the dual line SSD device 404 over PCIe EP 406. The local server 402 then triggers a command to the dual line SSD device 404 over the PCIe EP 406 for initiating transfer of data, wherein the data is stored by a remote server 408 over the network interface 412 before occurrence of a connection failure of the network interface 412. The connection failure of the network interface 412 includes (a) a connection failure between the network interface 412 and the remote server 408, (b) a connection failure between the network interface 412 and a remote direct memory access over converged ethernet/an Internet Wide-area RDMA Protocol (RoCE/iWARP) 414, (c) a connection failure between the network interface 412 and an NVMeoF target controller 416 and (d) a connection failure between the NVMeoF target controller 416 and an NVMe controller 418 (as shown in FIG. 5). The data transfer is enabled between the dual line SSD device 404 and the local server 402 over the PCIe EP 406 (as shown as by a solid line path in FIG. 5) when the network interface 412 malfunctions or fails to access the dual line SSD device 404.

Figure 6:
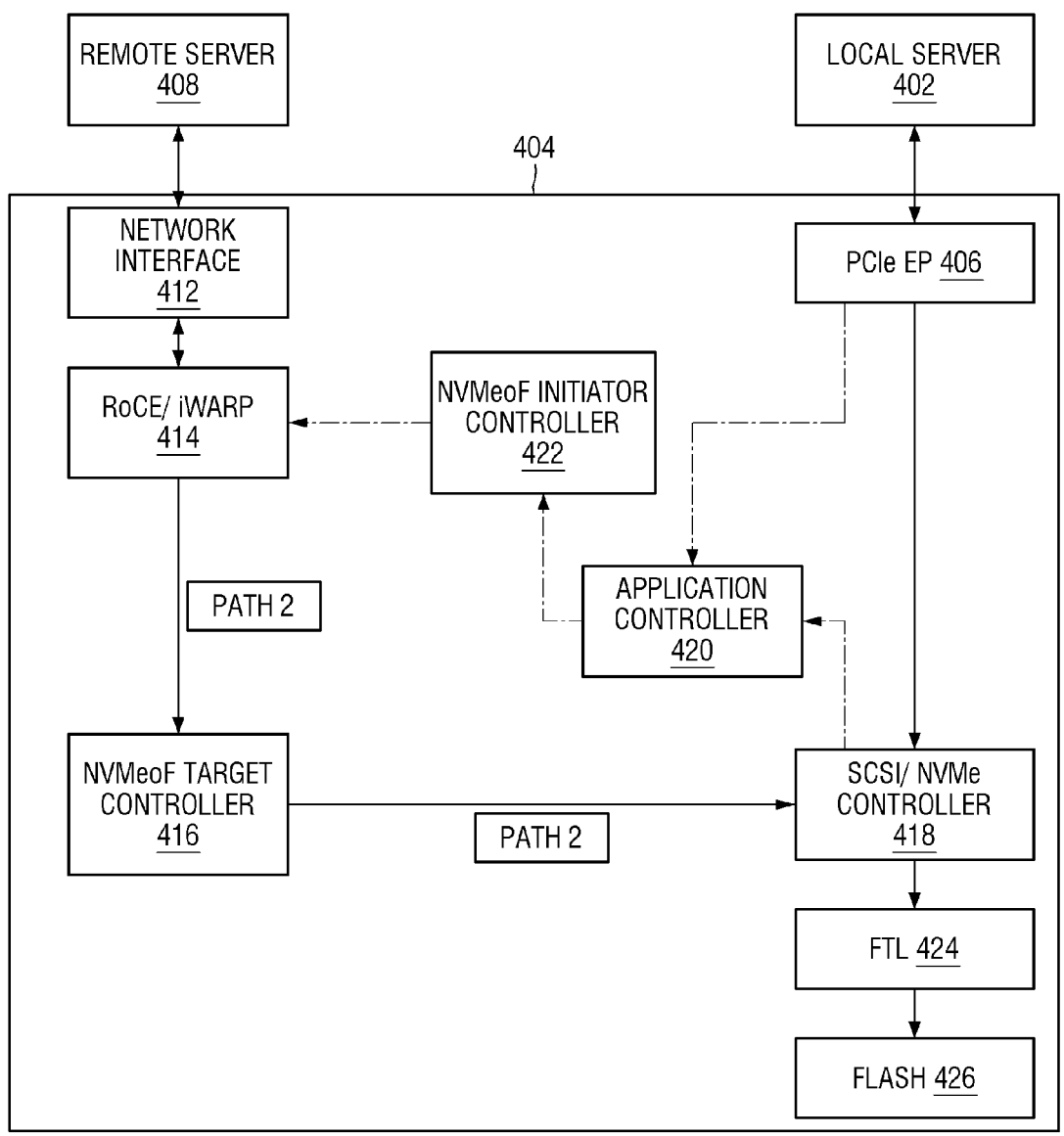
FIG. 6 illustrates a method for enabling access to a dual line SSD device by a remote server when there is under-utilization of the dual line SSD device by a local server over PCIe EP, according to an embodiment of the present disclosure.

FIG. 6 illustrates a method for enabling access to a dual line SSD device 404 by a remote server 408 when there is under-utilization of the dual line SSD device 404 by a local server 402 over PCIe EP 406, according to an embodiment of the present disclosure. According to this embodiment, the local server 402 establishes a connection with the dual line SSD device 404 over the PCIe EP 406 (path1). The remote server 408 accesses the dual line SSD device 404 over a network interface 412 (path2—as depicted by solid lines in FIG. 6) when the local server 402 under-utilizes the dual line SSD device 404.

Figure 7:
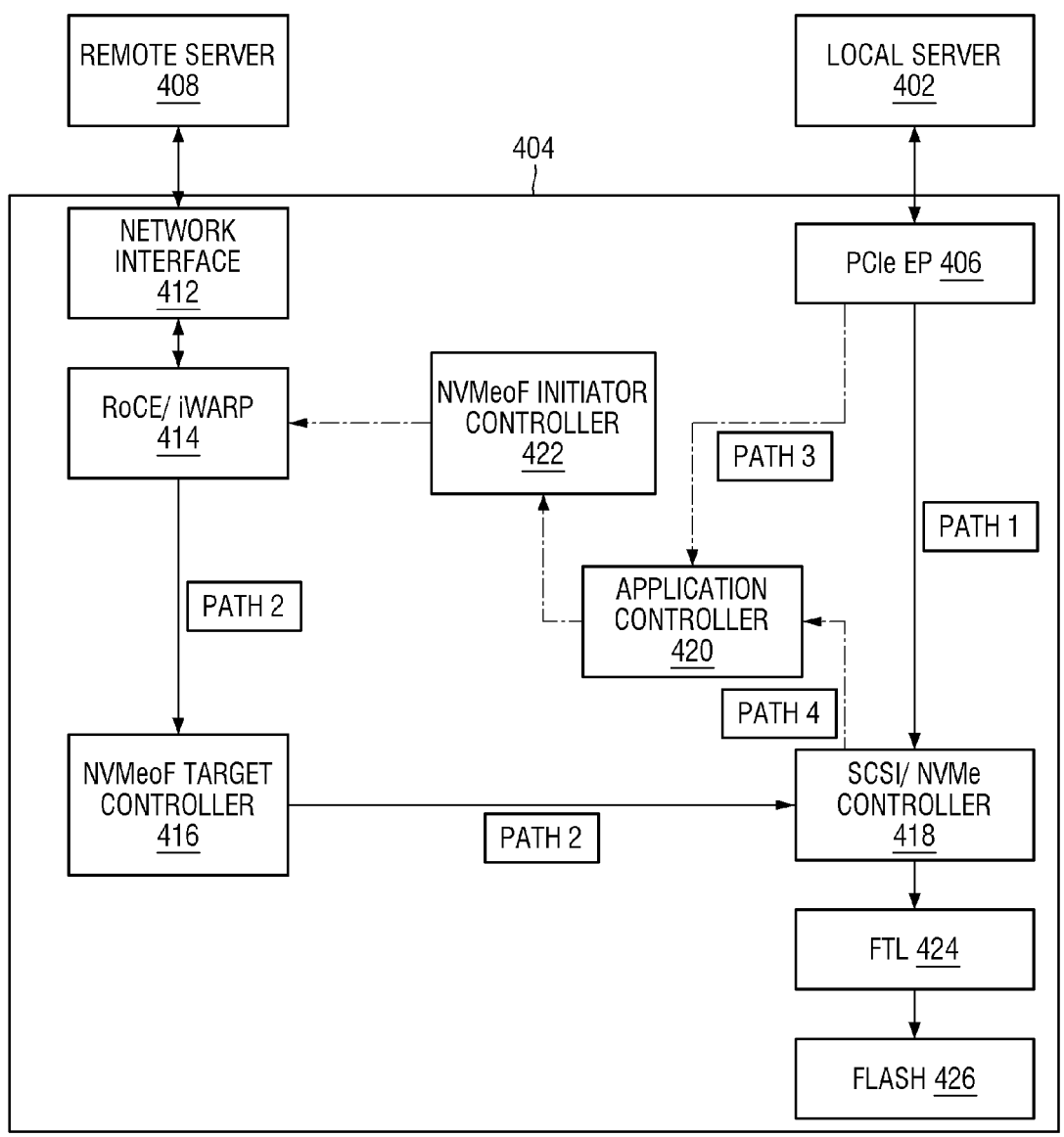
FIG. 7 illustrates a method for accessing a dual line SSD device through a network interface and a PCIe EP simultaneously, according to an embodiment of the present disclosure.

FIG. 7 illustrates a method for accessing a dual line SSD device 404 through a network interface 412 and a PCIe EP 406 simultaneously, according to an embodiment of the present disclosure. According to this embodiment, the dual line SSD device 404 establishes a connection with a local server 402 and a remote server 408 through the PCIe EP 406 and the network interface 412 respectively. The connection between the local server 402 and the dual line SSD device 404 is established by transmitting data of a plurality of non-volatile memory express queues from the local server 402 to the dual line SSD device 404 through the PCIe EP 406. The local server 402 establishes an administrative queue with the dual line SSD device 404 using attributes of the administrative queue and NVMeoF protocol through remote direct memory access (RDMA). The local server 402 further establishes an input/output queue by posting a command in the administrative queue to an NVMe controller 418. Path 1 in FIG. 7 shows data transfer between the local server 402 and a flash 426 of the dual line SSD device 404 through a FTL 424.

The connection between the remote server 408 and the dual line SSD device 404 is established through the network interface 412 by creating a plurality of network transport queue pairs. The remote server 408 establishes the administrative queue with the dual line SSD device 404 using NVMeoF through the plurality of network transport queues. The remote server 408 establishes the input/output queue with the dual line SSD device 404 by posting the command to an NVMeoF target controller 416 in the administrative queue through the plurality of network transport queues. Path 2 in FIG. 7 shows the data transfer between the remote server 408 and the flash 426 of the dual line SSD device 404 through the FTL 424.

The connection between the local server 402 and any remote network node in a network through the dual line SSD device 404 is shown as path 3 in FIG. 7. In this path 3, the dual line SSD device 404 functions as an initiator over the network interface 412. The dual line SSD device 404 operates as both a target and the initiator simultaneously when path 3 and path 2 are operational in parallel. Path 3 in FIG. 7, enables RNIC functionality of the dual line SSD device 404 for the local server 402.

In addition, the dual line SSD device 404 functions as network initiator (as shown in path 4) when the NVMe controller 418 triggers an application controller 420 to function as an initiator for initiating data transfer between the remote server 408 and the dual line SSD device 404.

The local server 402 utilizes the dual line SSD device 404 as a local storage device by accessing local storage of the dual line SSD device 404 through the PCIe EP 406, the FTL 424 and the flash 426. The local server 402 also communicates to the remote server 408 to enable the dual line SSD device as an RNIC through the PCIe EP 406, the application controller 420, an NVMeoF initiator controller 422, RoCE/iWARP 414 and the network interface 412 over a network. In an embodiment, the network includes at least one of a wired network and a wireless network.

In one embodiment, the dual line SSD device 404 is enabled as a storage device over the network interface 412 when the connection is established between the remote server 408 and the dual line SSD device 404. In another embodiment, the dual line SSD device 404 is enabled as the storage device over the PCIe EP 406 when the connection is established between the local server 402 and the dual line SSD device 404. In yet another embodiment, the dual line SSD device 404 is enabled as an RNIC to communicate with the remote server 408 from the local server 402 over the network interface 412. In yet another embodiment, the dual line SSD device 404 is enabled as (a) the storage device over the PCIe EP 406 and over the network interface 412 and (b) the RNIC over the network interface 412 by the local server 402 through the PCIe EP 406 simultaneously.

The dual line SSD device 404 functions as an initiator when the dual line SSD device 404 is enabled as the RNIC over the network interface 412 by the local server 402. The dual line SSD device further functions as a target when the dual line SSD device is enabled as the storage device over the network interface 412 by the remote server 408. The dual line SSD device 404 further functions as an RNIC initiator and a storage device target simultaneously over the network interface 412.

In another embodiment, the method allows enabling thin provisioning on the dual line SSD device 404. According to this embodiment, the local server 402 accesses the local storage of the dual line SSD device 404 through the PCIe EP 406. Accessing the dual line SSD device 404 through the PCIe EP 406 leads to under-utilization of the dual line SSD device 404. The thin provisioning on the dual line SSD device 404 is enabled by accessing data from the local storage by the remote server 408 over the network interface 412. The remote server 408 accesses the data from the local storage by extracting information about the local storage utilization through a discovery log to enable thin provisioning on the under-utilized dual line SSD device 404. The under-utilized dual line SSD device 404 transmits a vendor command to the remote server 408 to reclaim allocated storage space for the remote server 408 back to the local server 402.

In yet another embodiment, the method allows enabling the transfer of the data between the dual line SSD device 404 and the local server 402 upon failure of the network interface 412. According to this embodiment, the local server 402 establishes a connection with the dual line SSD device 404 over the PCIe EP 406 by creating I/O queue pairs and administrative queue attributes. The local server 402 then triggers the command to the dual line SSD device 404 for initiating the transfer of the data from the dual line SSD device 404, wherein the data is stored by the local server 402 over the network interface 412 before the occurrence of network interface 412 connection failure. The data transfer is enabled between the dual line SSD device 404 and the local server 402 over the PCIe EP 406.

In yet another embodiment, the method allows reading the data from the dual line SSD device 404 by the local server 402. According to this embodiment, the local server 402 sends a read command to the dual line SSD device 404 over the PCIe EP 406. The NVMe controller 418, upon reception of the read command from the local server 402, posts the read command to the FTL 424 or triggers the application controller 420 (over path 4) to create the connection with the remote server 408 by creating the plurality of network transport queue pairs. The NVMe controller 418 completes the transfer of the data through the FTL 424 when the read command hits a local storage target. The NVMe controller 418 triggers the read command to an intended remote target when the read command misses the local storage target.

In yet another embodiment, the method allows writing data to the dual line SSD device 404 by the local server 402. According to this embodiment, the local server 402 sends a write command to the dual line SSD device 404 over the PCIe EP 406. The NVMe controller 418, upon reception of the write command from the local server 402, posts the write command to the FTL 424 or triggers the application controller 420 over path 4 to create the connection with the remote server 408 by creating the plurality of network transport queue pairs based on a cache write scheme. The NVMe controller 418 completes transfer of the data when the write command is completed in local storage and remote storage based on the cache write scheme.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Figure 8:
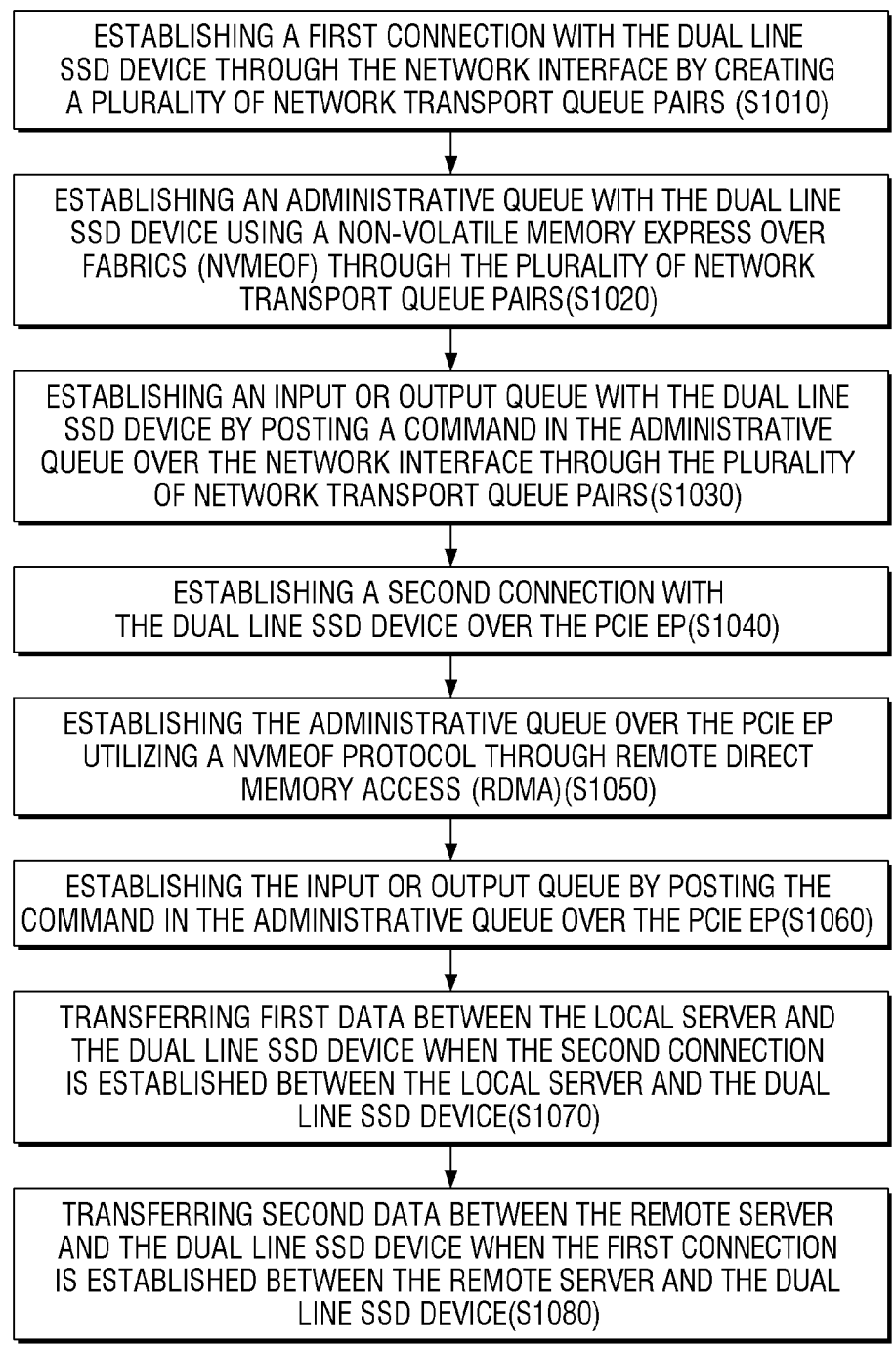
FIG. 8 illustrates a method of simultaneously accessing a dual line solid-state drive (SSD) device through a network interface and a peripheral component interconnect express end point (PCIe EP), according to an embodiment of the present disclosure.

FIG. 8 illustrates a method of simultaneously accessing a dual line solid-state drive (SSD) device through a network interface and a peripheral component interconnect express end point (PCIe EP), according to an embodiment of the present disclosure. According to this embodiment, a remote server establishes a first connection with the dual line SSD device through the network interface by creating a plurality of network transport queue pairs (S1010). The remote server establishes an administrative queue with the dual line SSD device using a non-volatile memory express over fabrics (NVMeoF) through the plurality of network transport queue pairs (S1020). The remote server establishes an input or output queue with the dual line SSD device by posting a command in the administrative queue over the network interface through the plurality of network transport queue pairs (S1030). A local server establishes a second connection with the dual line SSD device over the PCIe EP (S1040). The local server establishes the administrative queue over the PCIe EP utilizing a NVMeoF protocol through remote direct memory access (RDMA)(S1050). The local server establishes the input or output queue by posting the command in the administrative queue over the PCIe EP (S1060). An NVMeoF controller transfers by first data between the local server and the dual line SSD device when the second connection is established between the local server and the dual line SSD device (S1070). The NVMeoF controller transfers second data between the remote server and the dual line SSD device when the first connection is established between the remote server and the dual line SSD device (S1080).

While the specification has been described in detail with respect to specific embodiments of the disclosure, it will be appreciated that those skilled in the art, upon attaining an understanding of the foregoing, may readily conceive of alterations to, variations of, and equivalents to these embodiments. These and other modifications and variations to the present disclosure may be practiced by those of ordinary skill in the art, without departing from the scope of the present disclosure. Furthermore, those of ordinary skill in the art will appreciate that the foregoing description is by way of example only and is not intended to limit the disclosure. Thus, it is intended that the present subject matter covers such modifications and variations.

We claim:

1. A method of simultaneously accessing a dual line solid-state drive (SSD) device through a network interface and a peripheral component interconnect express end point (PCIe EP), the method comprising:
    establishing, by a remote server, a first connection with the dual line SSD device through the network interface by creating a plurality of network transport queue pairs;
    establishing, by the remote server, an administrative queue with the dual line SSD device using a nonvolatile memory express over fabrics (NVMeoF) through the plurality of network transport queue pairs;

establishing, by the remote server, an input or output queue with the dual line SSD device by posting a command in the administrative queue over the network interface through the plurality of network transport queue pairs;

establishing, by a local server, a second connection with the dual line SSD device over the PCIe EP;

establishing, by the local server, the administrative queue over the PCIe EP utilizing a NVMeoF protocol through remote direct memory access (RDMA);

establishing, by the local server, the input or output queue by posting the command in the administrative queue over the PCIe EP;

transferring, by an NVMeoF controller, first data between the local server and the dual line SSD device when the second connection is established between the local server and the dual line SSD device;

transferring, by the NVMeoF controller, second data between the remote server and the dual line SSD device when the first connection is established between the remote server and the dual line SSD device; and communicating third data between the remote server and the local server through the network interface and the PCIe EP, wherein the first connection and the second connection are physically from separated each other.

2. The method as claimed in claim 1, wherein the plurality of network transport queue pairs comprises a plurality of target network transport queue pairs and a plurality of initiator network transport queue pairs.

3. The method as claimed in claim 1, wherein the method further comprises:
enabling the dual line SSD device as a storage device over the network interface;
enabling the dual line SSD device as the storage device over the PCIe EP;
enabling the dual line SSD device as a remote network interface controller (RNIC) to communicate with the remote server over the network interface; and
enabling the dual line SSD device as (a) the storage device over the network interface, (b) as the storage device over the PCIe EP and (c) as the RNIC over the network interface simultaneously.

4. The method as claimed in claim 3, wherein the dual line SSD device:
functions as an initiator device when the dual line SSD device is enabled as the RNIC over the network interface by the local server;
functions as a target device when the dual line SSD device is enabled as the storage device over the network interface by the remote server; and
functions as an RNIC initiator device and a storage device target over the network interface simultaneously.

5. A dual line solid-state drive (SSD) device comprising:
a network interface that establishes a first connection with a remote server by creating a plurality of network transport queue pairs;
a peripheral component interconnect express end point (PCIe EP) that establishes a second connection with a local server, the second connection being physically separated with the first connection;
a non-volatile memory express (NVMe) controller that establishes a first data transfer between the local server and the dual line SSD device when the second connection is established between the local server and the dual line SSD device; and
a non-volatile memory express over fabrics (NVMeoF) target controller that establishes a second data transfer between the remote server and the dual line SSD device when the first connection is established between the remote server and the dual line SSD device, wherein the network interface and the PCIe EP communicate first data between the remote server and the local server.

6. The dual line SSD device of claim 5, further comprising an application controller that creates the first connection with the remote server through an NVMeoF initiator controller by creating the plurality of network transport queue pairs when triggered by the NVMe controller.

7. The dual line SSD device of claim 5, wherein the dual line SSD device:
enables a first transfer of data through the network interface when the PCIe EP malfunctions or a connection failure with the PCIe EP occurs;
enables a second transfer of data through the PCIe EP when the network interface malfunctions or a connection failure with the network interface occurs;
enables a third transfer of data through the PCIe EP and the network interface simultaneously; or
enables thin provisioning by enabling access for the remote server when the dual line SSD device is under-utilized by the local server.

8. A dual line solid-state drive (SSD) device comprising:
a nonvolatile memory device;
a network interface that communicates first data between the nonvolatile memory device and a remote server through a nonvolatile memory express over fabrics (NVMeoF) connection; and
a peripheral component interconnect express end point (PCIe EP) that communicates second data between the nonvolatile memory device and a local server through a non-volatile memory express (NVMe) connection, wherein:
the NVMeoF connection and PCIe EP are physically separated from each other, and
the network interface and the PCIe EP communicate third data between the remote server and the local server.

9. The SSD device of claim 8, wherein the SSD device simultaneously operates as a network target and a network initiator to provide storage and remote network interface controller functionality.

10. The SSD device of claim 8, wherein the network interface communicates the first data between the nonvolatile memory device and the remote server through the NVMeoF connection in response to the SSD device determining, by a predetermined criterion, that the nonvolatile memory device is being under-utilized by the local server.

11. The SSD device of claim 8, wherein the SSD device instructs the remote server to re-allocate, between the local server and the remote server, storage space within the nonvolatile memory device in response to determining, by a predetermined criterion, that the nonvolatile memory device is being under-utilized by the local server.

12. The method of claim 1, wherein the SSD device simultaneously operates as a network target and a network initiator to provide storage and remote network interface controller functionality.

13. The method of claim 1, wherein the NVMeoF controller communicates the second data between the dual line SSD device and the remote server through the first connection in response to the dual line SSD device determining, by a predetermined criterion, that the dual line SSD device is being under-utilized by the local server.

14. The method of claim 1, wherein the dual line SSD device instructs the remote server to re-allocate, between the local server and the remote server, storage space within the dual line SSD device in response to determining, by a predetermined criterion, that the dual line SSD device is being under-utilized by the local server.

15. The dual line SSD device of claim 5, wherein the dual line SSD device simultaneously operates as a network target and a network initiator to provide storage and remote network interface controller functionality.

16. The dual line SSD device of claim 5, wherein the NVMeoF controller communicates second data between the dual line SSD device and the remote server through the network interface in response to the dual line SSD device determining, by a predetermined criterion, that the dual line SSD device is being under-utilized by the local server.

17. The dual line SSD device of claim 5, wherein the dual line SSD device instructs the remote server to re-allocate, between the local server and the remote server, storage space within the dual line SSD device in response to determining, by a predetermined criterion, that the dual line SSD device is being under-utilized by the local server.

* * * * *